United States Patent [19]

Hunt

[11] Patent Number: 5,685,423
[45] Date of Patent: Nov. 11, 1997

[54] MIXED MEDIA STORAGE TRAY

[75] Inventor: Thomas A. Hunt, Encinitas, Calif.

[73] Assignee: Spectrum Concepts, Inc., Encinitas, Calif.

[21] Appl. No.: 562,497

[22] Filed: Nov. 24, 1995

Related U.S. Application Data

[63] Continuation of Ser. No. 91,242, Jul. 12, 1993, abandoned, which is a continuation-in-part of Ser. No. 763,961, Sep. 23, 1991, abandoned.

[51] Int. Cl.⁶ .................................................. B65D 85/672
[52] U.S. Cl. ............................ 206/307.1; 206/387.14
[58] Field of Search ........................ 206/307, 307.1, 206/387.14; 211/40; 312/9.1, 9.9, 9.47, 9.48, 9.51, 9.52, 9.53, 9.54, 9.55, 956

[56] References Cited

U.S. PATENT DOCUMENTS

| | | | |
|---|---|---|---|
| 4,705,169 | 11/1987 | Mastronardo | 206/387 |
| 4,781,423 | 11/1988 | Muerzer et al. | 206/387 X |
| 4,782,949 | 11/1988 | Berkman | 206/387 |
| 4,960,205 | 10/1990 | Wang | 206/444 X |

*Primary Examiner*—Jacob K. Ackun
*Attorney, Agent, or Firm*—J. E. McTaggart

[57] ABSTRACT

A multi-media storage tray for storing mixed media items such as compact discs, audio tapes Sega cartridges and Nintendo cartridges and video tapes. Dividers are located on a two-level (top and lower) divider support. The dividers and the divider supports are arranged so that the tray can be essentially filled with any combination of the above mixed media. A set of first dividers located on the top level and spaced about 1 inch apart accommodates approximately 1-inch wide video tape cases. A set of second dividers on the lower level and spaced about 1.4 inches apart accommodates two approximately 0.7-inch wide cases for audio tapes or Sega cartridges or Nintendo cartridges in between each two successive second dividers. A set of third dividers two of which are spaced between each two successive second dividers provides three 0.41-inch wide spaces between each two successive second dividers to accommodate the width of compact disc cases. The divider supports are arranged parallel to each other so that vertical walls connecting the lower level to the top level are about 4.85 inches (the length of a standard compact disc case) apart. The third dividers extend from the walls about 0.25 inch so as to provide a boundary (4.85 inches minus 0.5 inch) on the second level to accommodate the approximate 4.3-inch length of the cases for audio tapes and Sega and Nintendo cartridges.

10 Claims, 5 Drawing Sheets

MIXED MEDIA STORAGE TRAY

This application is a continuation of Ser. No. 08/091,242, filed Jul. 12, 1993 now abandoned, which is a continuation in part of Ser. No. 07/763,961, filed Sep. 23, 1991 now abandoned. This invention relates to storage devices and in particular to devices for the storage of audio and video tapes and discs and game cartridges.

BACKGROUND OF THE INVENTION

Many storage trays, racks and cabinets exists for the storage of various types of video and audio tapes, cassettes and discs and cartridges for video games. (In this specification I will sometime refer to a collection of two or more different types of tapes, discs or cartridges as "mixed media" and a collection of only one type as "media".) Typically, those facilities currently available for organized storage of these items are suitable for the storage of only one type of media. Typical American families have accumulated an assortment of such tapes, discs, cassettes and cartridges, and in many cases they are stored more or less randomly in closets on shelves and various other places around the house.

Some facilities exists for organized storage of several types of media but typically each media has its own space. Once the space for a given media is filled up no more of that media can be conveniently stored in the facility even though much space may exist in such facility for storage of other types of media.

What is needed is a storage device where all types of tapes, cassettes, cartridges and discs can be stored together orderly so that the storage space can be fully utilized until it is completely full no matter what the mix.

SUMMARY OF THE INVENTION

The present invention provides a multi-media storage tray for storing mixed media items such as compact discs, audio tapes, Sega cartridges and Nintendo cartridges and video tapes. Dividers are located on a two-level (top and lower) divider support. The dividers and the divider supports are arranged so that the tray can be essentially filled with any combination of the above mixed media. A set of first dividers located on the top level and spaced about 1 inch apart accommodates approximately 1-inch wide video tape cases. A set of second dividers on the lower level and spaced about 1.4 inches apart accommodates two approximately 0.7-inch wide cases for audio tapes or Sega cartridges or Nintendo cartridges in between each two successive second dividers. A set of third dividers two of which are spaced between each two successive second dividers provides three 0.41-inch wide spaces between each two successive second dividers to accommodate the width of compact disc cases. The divider supports are arranged parallel to each other so that vertical walls connecting the lower level to the top level am about 4.85 inches (the length of a standard compact disc case) apart. The third dividers extend from the walls about 0.25 inch so as to provide a boundary (4.85 inches minus 0.5 inch) on the second level to accommodate the approximate 4.3-inch length of the cases for audio tapes and Sega and Nintendo cartridges.

DETAILED DESCRIPTION OF THE PREFERRED EMBODIMENTS

The first embodiment of the present invention is a storage tray for the storage of an assortment of video and audio tapes, discs and cassettes and video games. These tapes, discs, cassettes and games are listed in Table I along with the dimensions of one of the sides of the usual containers in which the item is sold and in which it is usually stored.

TABLE 1

| Stored Item | Size of One Side |
| --- | --- |
| VHS Tape | 7.5 inches × 1 inch |
| Beta Tape | 6.1 inches × 0.95 inch |
| Compact Discs | 4.8 inches × 0.406 inch |
| Audio Tape | 4.3 inches × 0.68 inch |
| Sega Cartridges | 4.3 inches × 0.65 inch |
| Nintendo Cartridges | 4.2 inches × 0.68 inch |
| 8 M Video | 2.7 inches × 0.8 inch |
| DAT Audio Tape | 3.2 inch × 0.6 inch |

Grouping the items to be stored as I have in Table I gives a hint at the essence of my invention. Basically, I used a series of dividers arranged based on the thicknesses of the items to be stored and arranged in two or more levels in which each higher level captures wider items.

Figure 1:
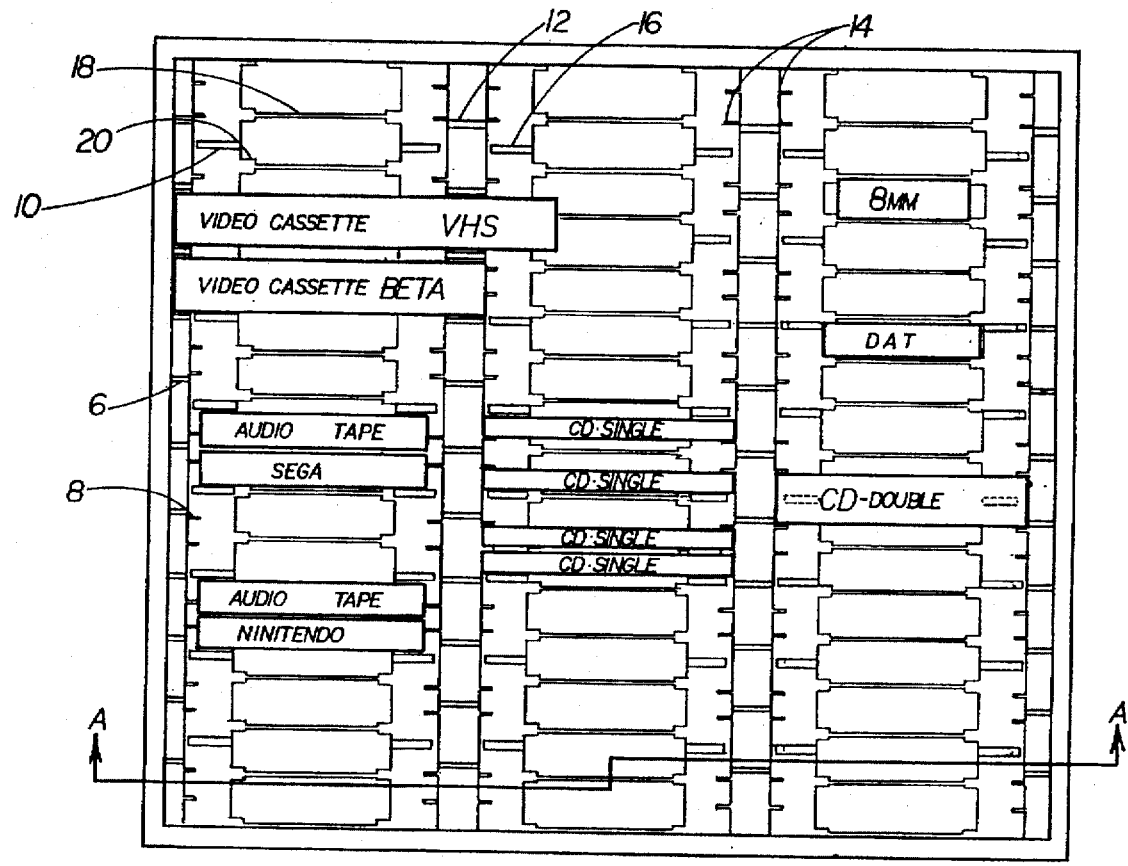
FIG. 1 is a top view of a preferred embodiment of the present invention
Figure 2:
FIG. 2 is a cross sectional view of the embodiment shown in FIG. 1 at Section AA.

A top view of a first embodiment of the present invention is shown in FIG. 1 and a cross section elevation view of the rack along cross section AA (from FIG. 1) is shown in FIG. 2. The overall size of the tray is generally 17¾ inches×14½ inches, sized to conveniently fit into standard furniture drawers. This embodiment is molded in one piece from any number of thermoplastics such as polystyrene or ABS plastic. The molded unit includes two side divider supports and two center divider supports. Each side divider support contains:

11 side VHS-beta dividers 6

18 side CD dividers 8

8 side audio tape-Sega-Nintendo dividers 10.

Each center divider support contains:

12 center VHS-Beta dividers 12

36 center CD dividers 14

16 center audio tape-Sega-Nintendo dividers 16.

Positioned in between the divider supports am three rows columns of spaces for 8M video cartridges and DAT cartridges. Each column contains 15 8M spacers 18 and 30 DAT spacers 20.

The tray can hold the following items:

| | |
|---|---|
| A | 24 VHS tapes or |
| B | 24 Beta tapes or |
| C | 108 CD's or |
| D | 54 audio tapes of |
| E | 48 8M video's or |
| F | 48 DAT audio tapes. |

And the tray can hold many, many combinations of items. For example,

| | |
|---|---|
| G | 12 VHS and |
| | 54 CD's or |
| H | 6 video cassettes and |
| | 26 CD's and |
| | 13 audio tapes and |
| | 6 DAT tapes and |
| | 6 8M video's |

Obviously, there is nothing sacred about the overall size of the tray. In fact I have marketed a tray which is essentially the same as the one described above except its overall dimensions are about 12 inches×17 inches and them am appropriately fewer dividers. The side divider supports contain:

9 side VHS-beta dividers 6

16 side CD dividers 8

16 side audio tape-Sega-Nintendo dividers 10

Each center divider support contains:

9 center VHS-beta dividers 12

32 center CD dividers 14

14 center audio tape-Sega-Nintendo dividers 16.

Figure 3:
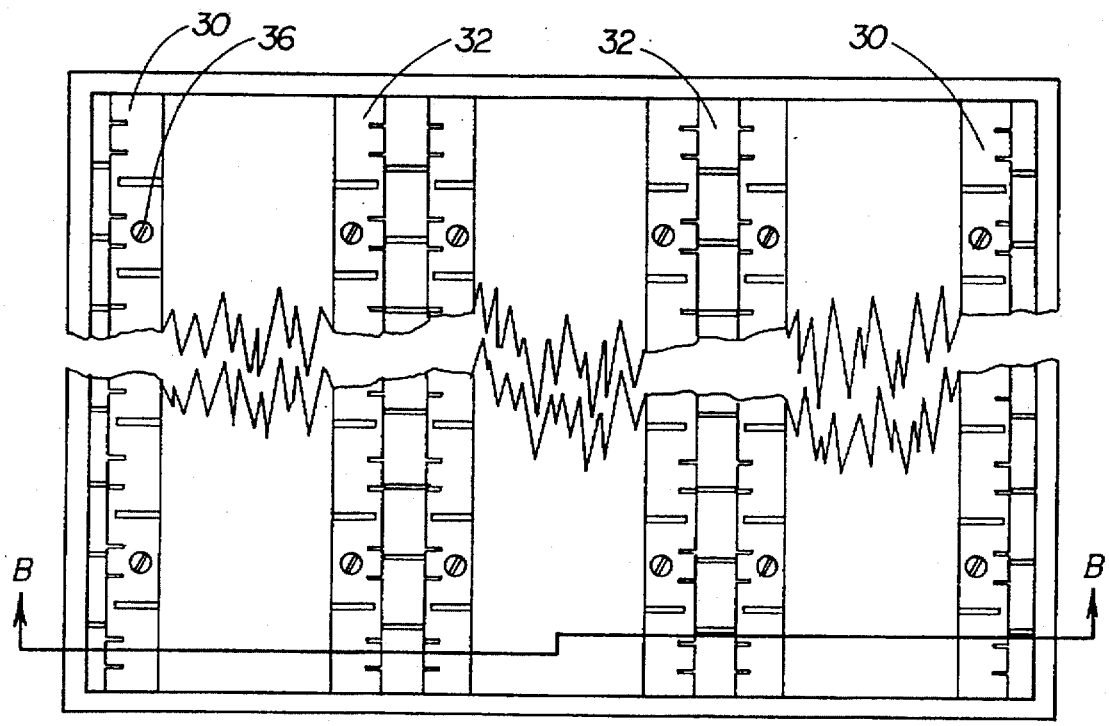
FIG. 3 is a top views of a second preferred embodiment of the present invention.

Another embodiment of the present invention is shown in FIG. 3. In this case a tray is made with two side supports 30 and two center supports 32 mounted on a 12.2-inch×17.6-inch plywood board 34 with wood screws 36. Dividers are spaced essentially the same as described above for the first described embodiment. This can store all of the mixed media listed in Table I except there are no specific slots for DAT audio tape and 8 mm video. These mixed media are not as common as the other media listed in Table I and therefore this simpler embodiment could be very adequate for many potential users.

Figure 5:
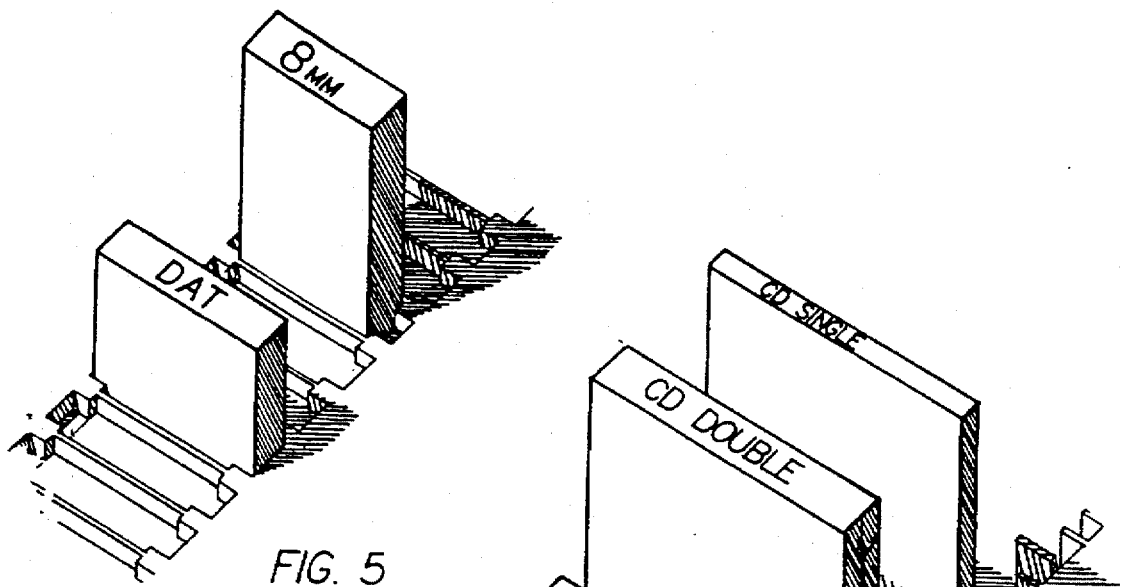
FIGS. 5, 6, 7, and 8 show examples of how mixed media items fit in the preferred embodiments of the present invention.
Figure 6:
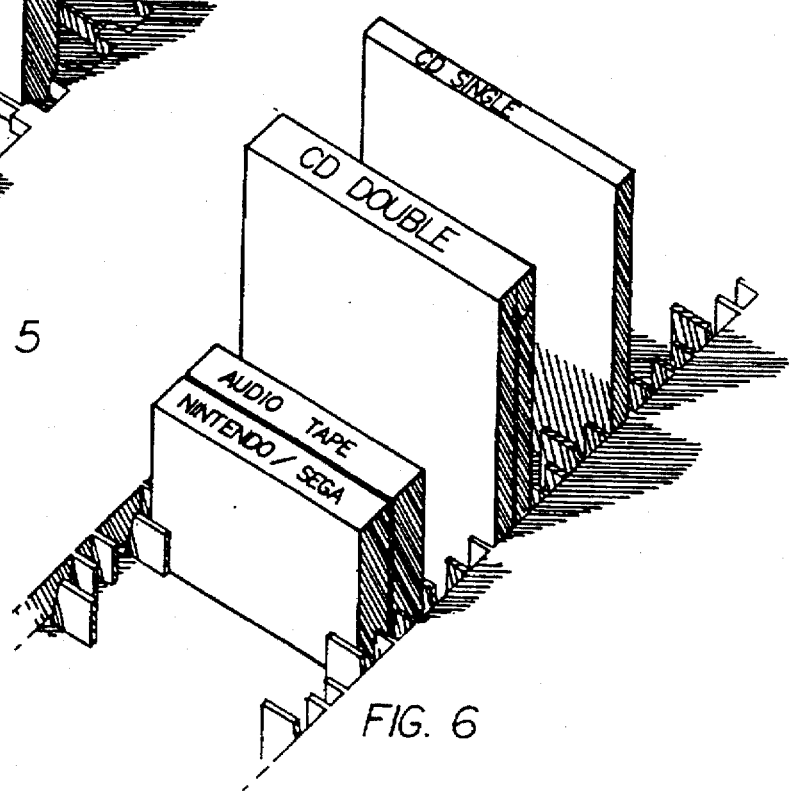
Figure 7:
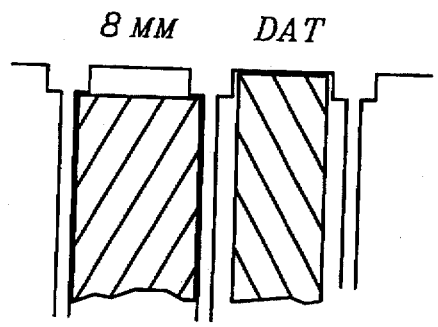
Figure 8:
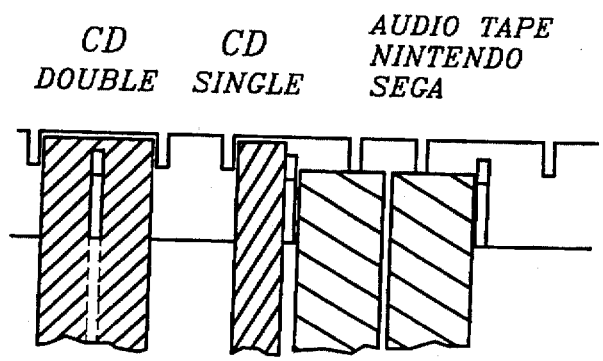

The supports are preferably molded from a thermo plastic such as polystyrene or ABS plastic. FIGS. 5, 6, 7 and 8 show close- up views of the dividers and slots and demonstrate how the recordings are placed in the trays. (Note that the slots shown in FIGS. 5 and 7 are not available in the FIG. 3 embodiment.)

Figure 4:
FIG. 4 is a cross sectional view of the embodiment shown in FIG. 3 at Section BB.

The essential feature of the present invention is the two-level divider supports and the special arrangement of the various dividers on the supports. The first level is indicated as 60 in FIG. 2 and FIG. 4. The second level is defined by the upwardly- facing divider support surface 62 in FIG. 2 and FIG. 4. On the top (or first) level, VHS-beta dividers 6 or 12 are spaced on 1.2-inch centers with 1.1 inch spacings in between the dividers to provide storage space for the VHS tape and beta tape cases which are about 1 inch and 0.95 inch wide as indicated in Table I. VHS video cassettes and beta video cassettes are shown installed in FIG. 1.

On the second level there are two types of dividers. One type is the audio tape-Sega-Nintendo divider 10 or 16. These are spaced on 1.5 inch centers with 1.4-inch spaces between them. Thus, there is just enough room between these dividers for two cases for audio tape, Sega cartridges or Nintendo cartridges, which as indicated in Table I are just slightly less than 0.7 inch wide. Also on the second level as shown in FIG. 1 are compact disc dividers 8 or 14. Two of these are spaced in between each two successive audio tape-Sega-Nintendo divider and set against the wall 64 forming the boundary of the second level. These CD dividers provide three spaces about 0.41 inch wide between each successive set of two audio tape-Sega-Nintendo dividers which is just the right width for the compact disc cases. The walls 64 of the divider supports are about 4.9 inches (i.e., slightly more than 4.85 inches) apart so that the 4.85-inch edge of the compact discs case will fit snugly in between the walls and compact disc dividers 8 or 14. The CD dividers 8 and 14 extend out from the walls of the second level by about 0.25 inch so that the narrow side of these CD dividers provide a boundary on the second level of about 4.35 inches which is just right as the second boundary for the audio tape, Sega and Nintendo cases. Note in FIG. 1 that the audio tape-Sega-Nintendo dividers are offset from the wall of the second level by about ⅛ inch. This permits the storage of double CD discs as shown in FIG. 1.

Figure 9:
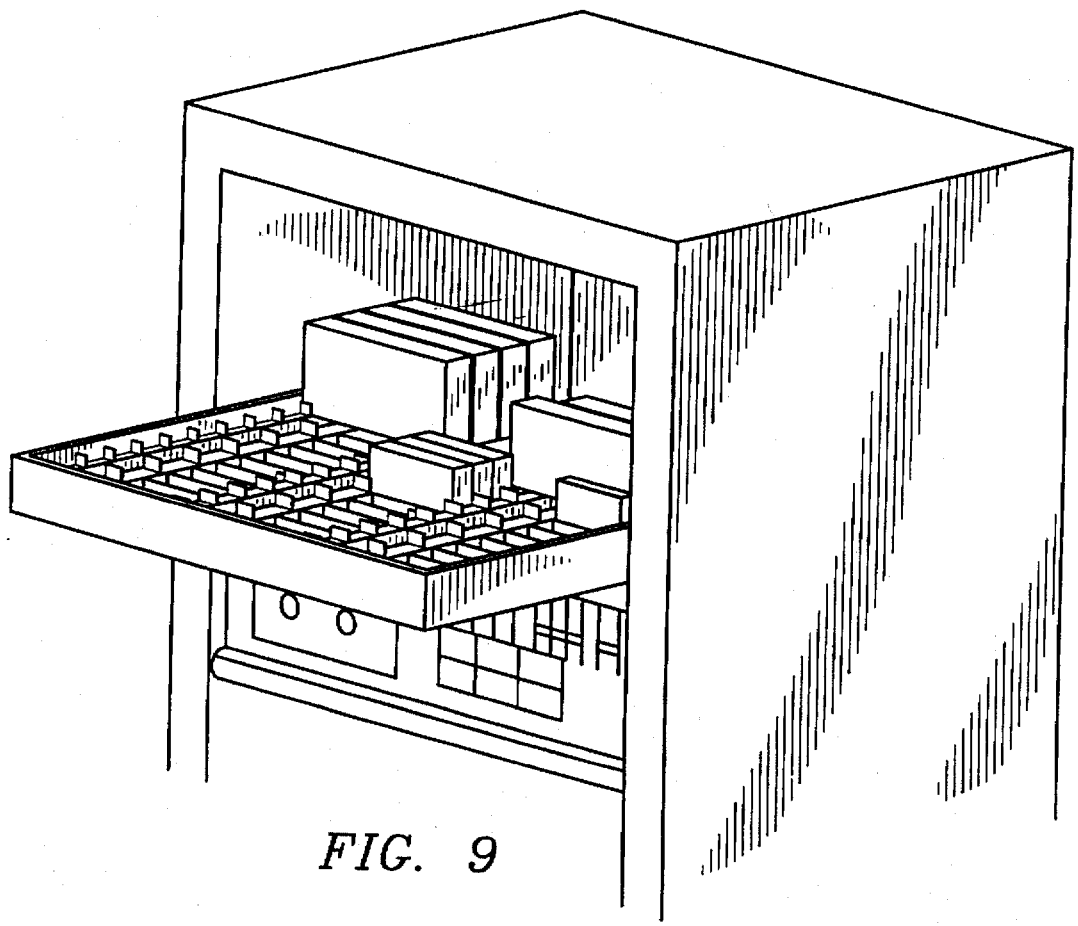
FIG. 9 shows a preferred embodiment of the present invention installed in a music cabinet.

The above embodiments are preferably installed as a drawer of a cabinet such as is shown in FIG. 9. I recommend use of standard extension slide hardware well known in the cabinet making art be mounted on two sides of the racks as shown in FIG. 9.

A very excellent use of the present invention is to install a tray such as described above, especially my 12-inch×17-inch model in the space now occupied in thousands of music cabinets by old turntables. These turntables are rarely if ever used these days because phonograph records have basically been replaced by audio CD's and tapes.

Figure 10:
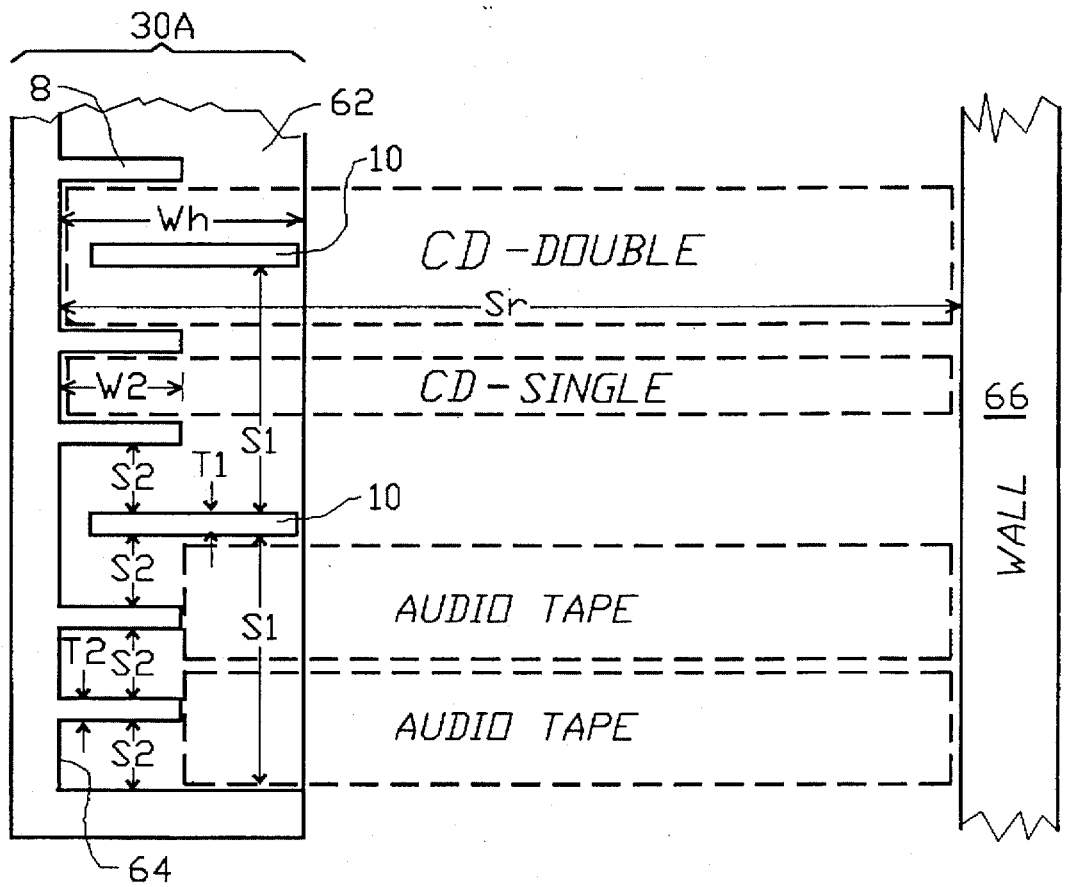
FIG. 10 illustrates an embodiment utilizing only one divider support, shown in part in an enlarged top view with dimensional symbols.

FIG. 10 depicts an embodiment of the invention that utilizes only one divider support 30A having dividers 10 of a first type and dividers 8 of a second type configured in the same repetitive pattern as in FIG. 3. As shown in dashed lines, mixed media may be held between the divider support 30A and an inside wall 66 or ridge of a cabinet separated from vertical surface 64 by dimension Sr.

Dividers 10, seen extending to the inner (right hand) edge of the upwardly-facing horizontal surface 62 of divider support 30A, are separated by an inter-divider spacing dimension S1, typically made 1.356 inches to provide a support cell for a pair of audio tape packages as shown in dashed outline having a nominal thickness of 0.67 inches each and thus a combined thickness of 1.34 inches. Dividers 10 are typically made to have a thickness T1 of 0.150 inch.

Dividers 8, seen extending a distance W2 from the vertical surface 64, W2 being substantially less than the width Wh of the horizontal surface 62, are separated such as to define, between each pair of dividers 10, three uniform support cells each having an inter-divider spacing S2, typically made 0.4167 inches for supporting CD packages (CD-SINGLE/CD-DOUBLE: FIG. 1) having a nominal thickness of 0.412 inches. Dividers 8 are typically made to have a thickness T2 of 0.053 inches so as to make the spacing S2 uniform in all three cells located between each pair of dividers 10: it is apparent that 3(S2)+2(T2) must be made equal to S1.

In all embodiments, dividers forming "audio tape-Sega-Nintendo" support cells are made uniform with regard to dimensions S1 and T1; similarly dividers forming "CD" support cells are made uniform with regard to dimensions S2, T2 and W2; thus dividers 10 and 16 of the first type and dividers 8 and 14 of the second type, arranged in the repetitive divider groups shown, each group comprising one divider of the first type and two dividers of the second type, co-operating to form the pattern of support cells shown and described in connection with FIGS. 1, 3, 6, 8 and 10.

While the above description contains many specificities, the reader should not construe these as limitations on the scope of the invention, but merely as exemplifications of preferred embodiments. Those skilled in the art will envision many other variations are within its general scope. For example, a single row storage tray could by provided using only two rows of multi-layer spacers. The tray could be made from many materials other than plastic. For example, it could stamped from several metals. Accordingly, the reader is requested to determine the scope of the present invention by the appended claims and their legal equivalents, and not by the examples given above.

I claim:

1. A package-supporting structure, for providing organized columnar storage and display of orthogonal packages of at least first and second different sizes intermixed, with each package held in a generally upright position by engagement of a lower corner thereof with said structure, comprising:

an elongated divider support, disposed so as to define a first side boundary of a storage column, said divider support being configured to have:

a flat upwardly-facing basic horizontal surface extending full length of said divider support and having an outer edge located near the first side boundary of the column and an inner edge parallel to the outer edge, defining a width Wh of the horizontal surface, said surface providing bottom support for packages of the first and second sizes;

a flat vertical surface, facing inwardly relative to the column, extending upwardly from the outer edge of the horizontal surface;

a plurality of transverse, parallel, generally rectangular dividers, extending upwardly from the horizontal surface, said dividers consisting of:

a column of dividers of a first type, each having a thickness T1, extending inwardly substantially to the inner edge thereof, spaced uniformly along the rail by a spacing S1; and a column of dividers of a second type, each having a thickness T2, extending inwardly from the vertical surface and having a width W2 less than the width Wh of the horizontal surface, arranged in pairs, each pair disposed symmetrically between adjacent dividers of the first type and spaced so as to form a column of support cells with uniform inter-divider spacing S2 defined by a repetitive pattern of groups of dividers, each group comprising one of said dividers of the first type and two of said dividers of the second type.

2. The package-supporting structure as defined in claim 1, further comprising:

a vertical support surface disposed parallel to the vertical surface of said divider support, defining a second side boundary of the storage column opposite the first side boundary; and spacing means for securing said divider support and said vertical support surface in a manner to separate said vertical surface of said divider support from said vertical support surface by a predetermined spacing dimension Sr;

whereby a choice between support cells of two different sizes is provided in a space between each two adjacent divider supports of the first type: a single cell dimensioned S2 by Sr, and three cells each dimensioned S1 by Sr-W2, thus enabling said package-supporting structure to store and display packages of at least two different sizes intermixed.

3. The package-supporting structure as defined in claim 1, further comprising:

a second like elongated divider support, disposed in mirror image parallel relation to said divider support so as to define a second side boundary of the storage column opposite the first side boundary; and divider support spacing means for securing the divider supports in a manner to separate the vertical surfaces of the two divider supports by a predetermined inter-support spacing Sr;

whereby a choice between support cells of two different sizes is provided in a space between each two adjacent dividers of the first type: a single cell dimensioned S2 by Sr, and three cells each dimensioned S1 by Sr-2.W2, thus enabling said package-supporting structure to store and display packages of at least two different sizes intermixed.

4. The package-supporting structure as defined in claim 3, for supporting CD (compact disc) packages that are made nominally 4.9 inches wide and 0.412 inches thick and audio tape cassette packages that are made nominally 4.29 inches long and 0.67 inches thick, further defined to be configured such that:

the thickness T1 of dividers the first type is made to be 0.150 inches;

the spacing S1 between dividers of the first type is made to be 1.356 inches;

the thickness T2 of dividers of the second type is made to be 0.053 inches;

the width W2 of the dividers of the second type is made to be 0.3 inches;

the inter-divider support cell spacing S2 is made to be 0.4167 inches; and the inter-support vertical surface spacing Sr is made to be 4.95 inches;

whereby said package-supporting structure is enabled to support CD packages and audio cassette packages intermixed, since each space between dividers of the first type provides three support cells 4.95 inches (Sr) by 0.4167 inches (S2) that can each support a CD package in portrait orientation presenting a base 4.9 inches by 0.412 inches, and also provides a support cell 4.35 inches (Sr-2.W2) by 1.356 inches (S1) that can support a pair of audio tape cassette packages in landscape orientation presenting a base 4.29 inches by 1.34 inches.

5. The package supporting structure as defined in claim 4, wherein each horizontal surface is made to be approximately 12 inches long and 0.625 inches wide.

6. The package-supporting structure as defined in claim 3, for providing more than one column, further comprising:

at least one additional divider support, the divider supports being disposed in a parallel row of which two divider supports, one at each end of the row, are made to be identical side divider supports configured in accordance with said divider support of claim 8, and each of the one or more additional divider supports is a center divider support configured as said divider support defined in claim 8 further comprising an additional portion defining (a) a mirror image of said divider support defined in claim 8 and (b) a central raised horizontal surface adjoining at opposite edges thereof the upper edges of the two vertical surfaces;

whereby multiple storage columns are provided that can accommodate a mixture of at least two different sized packages.

7. The package-supporting structure as defined in claim 3 directed to packages of a third size differing in length and thickness from packages of the first and second size, the structure comprising two of said divider supports disposed as side divider supports opposite each other, each side divider support further comprising:

an elongated rectangular upwardly-facing flat raised horizontal surface having an inner edge adjoining the upper edge of the basic vertical surface, and extending in a direction away from the basic horizontal surface to an outer edge parallel to the inner edge, said raised horizontal surface being configured with a row of dividers of a third type, hereinafter named upper side dividers extending upwardly and separated by a spacing S3 equal to the thickness of the package of the third size plus a designated clearance;

an elongated rectangular flat secondary vertical surface having a lower edge adjoining the outer edge of the raised horizontal surface and extending upwardly therefrom to an upper edge parallel to the lower edge, said secondary vertical surface adjoining each of the upper side dividers along a side edge thereof;

whereby said package-supporting structure is enabled to support packages of the third size disposed vertically in landscape orientation supported on the upper horizontal surface of each side divider support constrained between a pair of upper dividers thereof and between the secondary vertical surfaces of said side divider supports.

8. The package-supporting structure as defined in claim 7, for supporting packaged VHS video tapes, configured such that the spacing S3 between the upper dividers is made 1.0 inch, whereby VHS packages with nominal length of 7.385 inches and thickness of 0.98 inches can be supported in landscape orientation by the upper dividers.

9. The package-supporting structure as defined in claim 3, further comprising means for accommodating a mixture of packages of the first, second and third sizes in multiple columns, the storage structure further comprising at least one central divider support disposed in an array flanked by and parallel to the side divider supports, said central divider support comprising, a central flat elongated rectangular flat raised horizontal surface disposed at the same level as the raised horizontal surfaces of the side divider supports, having parallel opposite edges;

a pair of divider supports as defined in claim 8 each having the upper edge of its vertical surface adjoining a respective opposite edge of said raised horizontal surface, the two vertical surfaces facing away from each other;

a row of upper dividers of a fourth type, named upper central dividers hereinafter, dimensioned similar to the upper side dividers and affixed onto the central horizontal surface facing upwardly;

two rows of thin dividers affixed on respective ones of the pair of vertical surfaces and the pair of horizontal surfaces in a pattern identical with that of the thin dividers in the side rails; and two rows of thick dividers affixed on respective ones of the pair of basic horizontal surfaces in a pattern identical with that of the thick dividers in the side divider supports;

each pair of adjacent divider supports being separated by a spacing between respective facing vertical surfaces equal to a predetermined package dimension plus a predetermined edge clearance;

whereby said package supporting structure is enabled to support packages of the third size in a mixture with those of the first and second sizes, each package of the third size being disposed vertically in landscape orientation supported on the upper horizontal surfaces of a selected pair of adjacent divider supports, between a pair of upper dividers on each divider support.

10. The package-supporting structure as defined in claim 3 provided with further capability of accommodating packages of a fourth size having nominal thickness 0.783 inches and width 2.675 inches for 8 mm video tape, and packages of a fifth size having nominal thickness 0.6 inches and width 3.2 inches for DAT (digital audio tape), the structure further comprising:

a rectangular base tray upon which said divider supports are secured on a planar base surface thereof at a predetermined spacing, said base tray being configured to provide, between each pair of divider supports, a columnar array of generally rectangular transverse recessed compartments, wherein each compartment is made to have a total length of 3.2 inches plus a predetermined length clearance dimension, a total width of 0.783 inches plus a predetermined width clearance dimension, and a predetermined depth, each compartment being made with four rectangular corner regions, extending inwardly, dimensioned such as to enable the compartment to accept and support vertically, in portrait orientation, a video tape package selected from packages of the fourth and fifth sizes;

whereby the package-supporting structure is enabled to additionally provide in effect two different sized support cell locations in each of the cavities and thus support a mixture of packages of 8 mm and DAT media.

* * * * *